(12) United States Patent
Mussenden

(10) Patent No.: US 6,563,271 B1
(45) Date of Patent: May 13, 2003

(54) NOISE CANCELING ELECTROLUMINESCENT LAMP DRIVER

(75) Inventor: Georg A. Mussenden, Coral Springs, FL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/634,683

(22) Filed: Aug. 8, 2000

(51) Int. Cl.[7] .................................................. G09G 3/10
(52) U.S. Cl. ................................. 315/169.3; 315/169.1; 315/169.6; 345/55
(58) Field of Search ........................... 315/169.1, 169.3, 315/169.4; 313/502, 503; 645/55, 76, 77

(56) References Cited

U.S. PATENT DOCUMENTS

| | | | |
|---|---|---|---|
| 4,449,075 A | * 5/1984 | D'Onofrio et al. | 315/169.3 |
| 5,463,279 A | * 10/1995 | Khormaei | 315/169.3 |
| 5,566,064 A | 10/1996 | Schoenwald et al. | 363/132 |
| 5,644,327 A | * 7/1997 | Onyskevych et al. | 315/169.3 |
| 5,670,974 A | * 9/1997 | Ohba et al. | 315/169.4 |
| 5,742,322 A | * 4/1998 | Cranton et al. | 347/238 |
| 6,121,943 A | * 9/2000 | Nishioka et al. | 315/169.3 |
| 6,184,849 B1 | * 2/2001 | Stoller | 345/72 |

OTHER PUBLICATIONS

Patent Abstract of Japan; Publication No. 09266068 A; Application No.: 08077205; Date of Filing: Mar. 29, 1996.

* cited by examiner

*Primary Examiner*—David Vu
*Assistant Examiner*—Jimmy T. Vu
(74) *Attorney, Agent, or Firm*—Jack D. Slobod

(57) ABSTRACT

A lighting system and method comprising at least two electroluminescent panel regions. Each electroluminescent panel region comprises a pair of electrodes with a phosphorous layer therebetween. The lighting system also comprises a lamp driver comprising a voltage supply source for supplying an AC voltage to the electrodes of each of the electroluminescent panel regions so as to cause the phosphorous layer of each electroluminescent panel regions to emit visible light. The lamp driver is configured to alternately charge the electrodes of a first electroluminescent panel region while simultaneously discharging the electrodes of a second electroluminescent panel region and vice versa, preferably at the same rate. The compression of the electrodes of one electroluminescent panel region are thus offset by the decompression of the electrodes of another electroluminescent panel region, thereby substantially canceling noise.

25 Claims, 5 Drawing Sheets ized to display and is typically held in very close proximity to
NOISE CANCELING ELECTROLUMINESCENT LAMP DRIVER

FIELD OF THE INVENTION

This invention relates generally to electroluminescent lighting, and more particularly to an improved electroluminescent lamp driver that substantially cancels noise.

BACKGROUND OF THE INVENTION

Electroluminescent lamps are thin planar light sources which are commonly employed to provide backlighting in the display panels of laptop computers, beepers, watches and a myriad of other commercial products. One product for which electroluminescent lamps are becoming increasingly prevalent is cellular telephones. Generally, many of the cellular telephones which are currently being produced have large display panels. The large display panels allow a user to operate the telephone by selecting options from a displayed menu, or to receive and display data via a wireless Internet service.

FIG. 1 is a cross-sectional view of a typical prior art electroluminescent panel 10. Disposed between a transparent front protective cover 12 and a rear protective cover 22 is a transparent front electrode 14, a phosphor layer 16, a dielectric element 18 and a rear electrode 20. During operation, voltage supply source 24 applies a high AC voltage across front electrode 14 and rear electrode 20, resulting in an electric field therebetween. Due to the electric field, the phosphor atoms in phosphor layer 16 are excited to a higher energy state. When the electric field is removed, the atoms fall back to a lower energy state, emitting photons as visible light in the process.

One of the problems experienced by prior art electroluminescent panels, however, is that they typically produce audible noise. Specifically, front electrode 14 and rear electrode 20 vibrate due to the fact that they are alternately attracted to each other (when an electric field is present) and relaxed (when the electric field is not present). Due to this vibration, air is displaced as the volume between the two electrodes is alternately compressed and then returned to normal. This vibration occurs at twice the frequency of the AC power source, since the compression occurs on both the positive and negative voltage excursions of the AC input. Thus, if the AC power source is operating within the typical range of 60 to 400 Hz, audible noise in the 120 to 800 Hz range is experienced by the user. While such audible noise is unpleasant in most commercial products, it is particularly undesirable if it occurs in a cellular telephone, since a cellular telephone is typically held in very close proximity to the user's ear and the sound quality of the telephone conversation will suffer.

Therefore, there exists a need for an electroluminescent panel which substantially cancels noise.

SUMMARY OF THE INVENTION

In accordance with one embodiment, the present invention relates to a lighting system and method comprising at least two electroluminescent panel regions. Each electroluminescent panel region comprises a pair of electrodes with a phosphorous layer therebetween. The lighting system also comprises a lamp driver comprising a voltage supply source for supplying an AC voltage to the electrodes of each of the electroluminescent panel regions so as to cause the phosphorous layer of each electroluminescent panel regions to emit visible light. The lamp driver is configured to alternately charge the electrodes of a first electroluminescent panel region while simultaneously discharging the electrodes of a second electroluminescent panel region. Preferably, the rate of charging the electrodes of the first electroluminescent panel regions is substantially equal to a rate of discharging the electrodes of the second electroluminescent panel regions.

According to one embodiment of the invention, the electrodes of the electroluminescent panel regions are compressed when the electrodes are charged and are decompressed when the electrodes are discharged. In this case, the lamp driver is configured such that the electrodes of a first electroluminescent panel region are compressed at a rate which is substantially equal to a rate at which the electrodes of a second electroluminescent panel region are decompressed, thereby substantially canceling noise which is generated in prior art electroluminescent panels when air is displaced between the electrodes.

In one embodiment, the lamp driver comprises a plurality of current flow control devices, such as p-channel or n-channel MOSFET transistors, coupled to the electrodes. The lamp driver also preferably comprises a system controller which is coupled to and configured to control the transistors. Specifically, the system controller controls which transistors are turned on and off and when, so as to alternately charge and discharge (thereby alternately compressing and decompressing) the electrodes in contiguous electroluminescent panel regions. The noise cancellation renders the lamp driver and electroluminescent panel regions particularly well-suited for employment in a cellular telephone.

BRIEF DESCRIPTION OF THE DRAWINGS

The present invention will be further understood from the following description with reference to the accompanying drawings, in which.

DETAILED DESCRIPTION OF THE INVENTION

The present invention, according to one embodiment, is directed to a lighting system which employs an electroluminescent panel. In a preferred embodiment, the electroluminescent panel comprises at least two contiguous electroluminescent panel regions.

Figure 2:
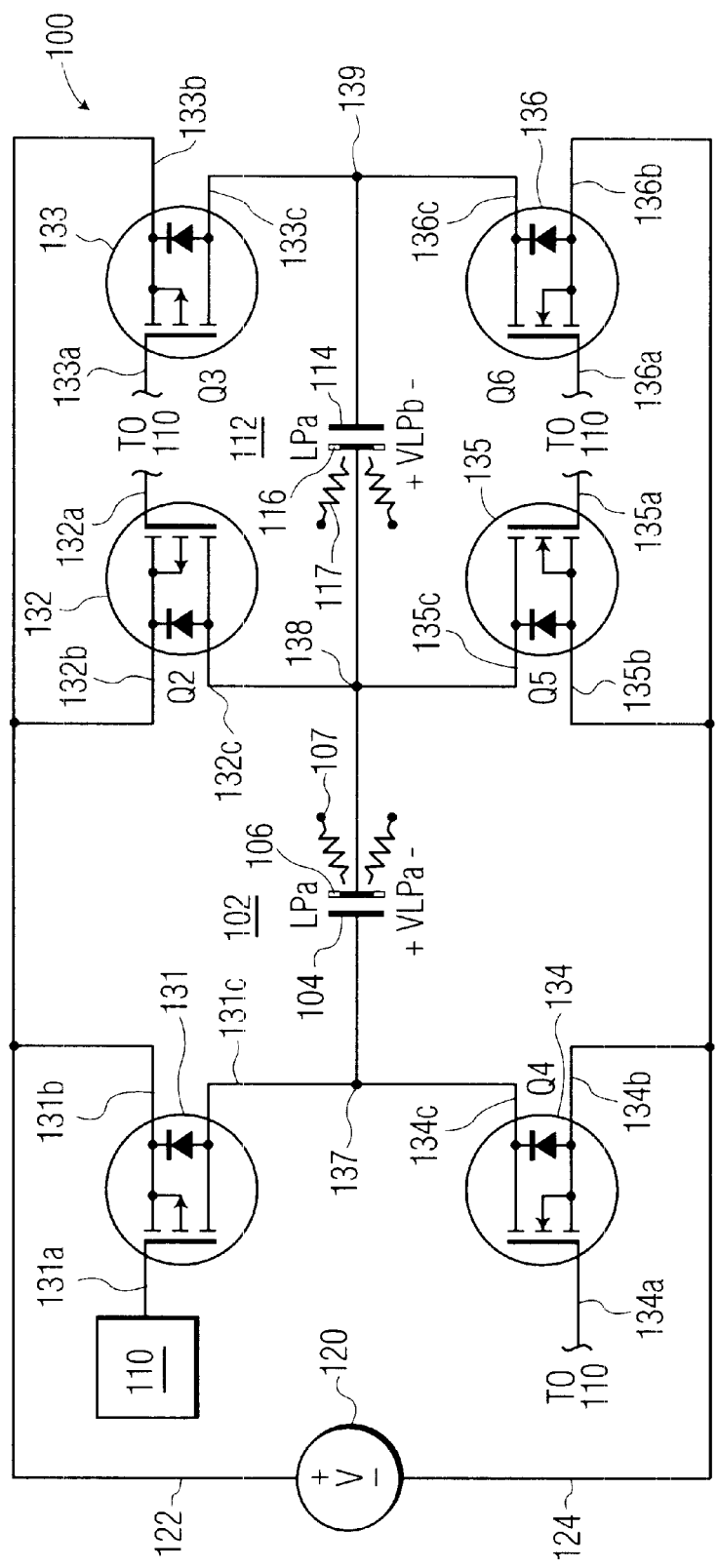
FIG. 2 is a circuit diagram that illustrates an electroluminescent lamp driver, according to one embodiment of the present invention.

FIG. 2 is a circuit diagram that illustrates a lighting system including an electroluminescent lamp driver 100. Lamp driver 100 drives an electroluminescent panel, which, according to the embodiment shown, comprises electroluminescent panel regions 102 and 112. Electroluminescent panel regions 102 and 112 operate as capacitors. As previously discussed, electroluminescent panel regions 102 and 112 are contiguous and together form a complete electroluminescent display panel. It is noted, however, that in various other embodiments of the present invention, there may be more than two regions which comprise electroluminescent display panel, and that two regions shown in FIG. 2 are merely illustrative.

Figure 1:
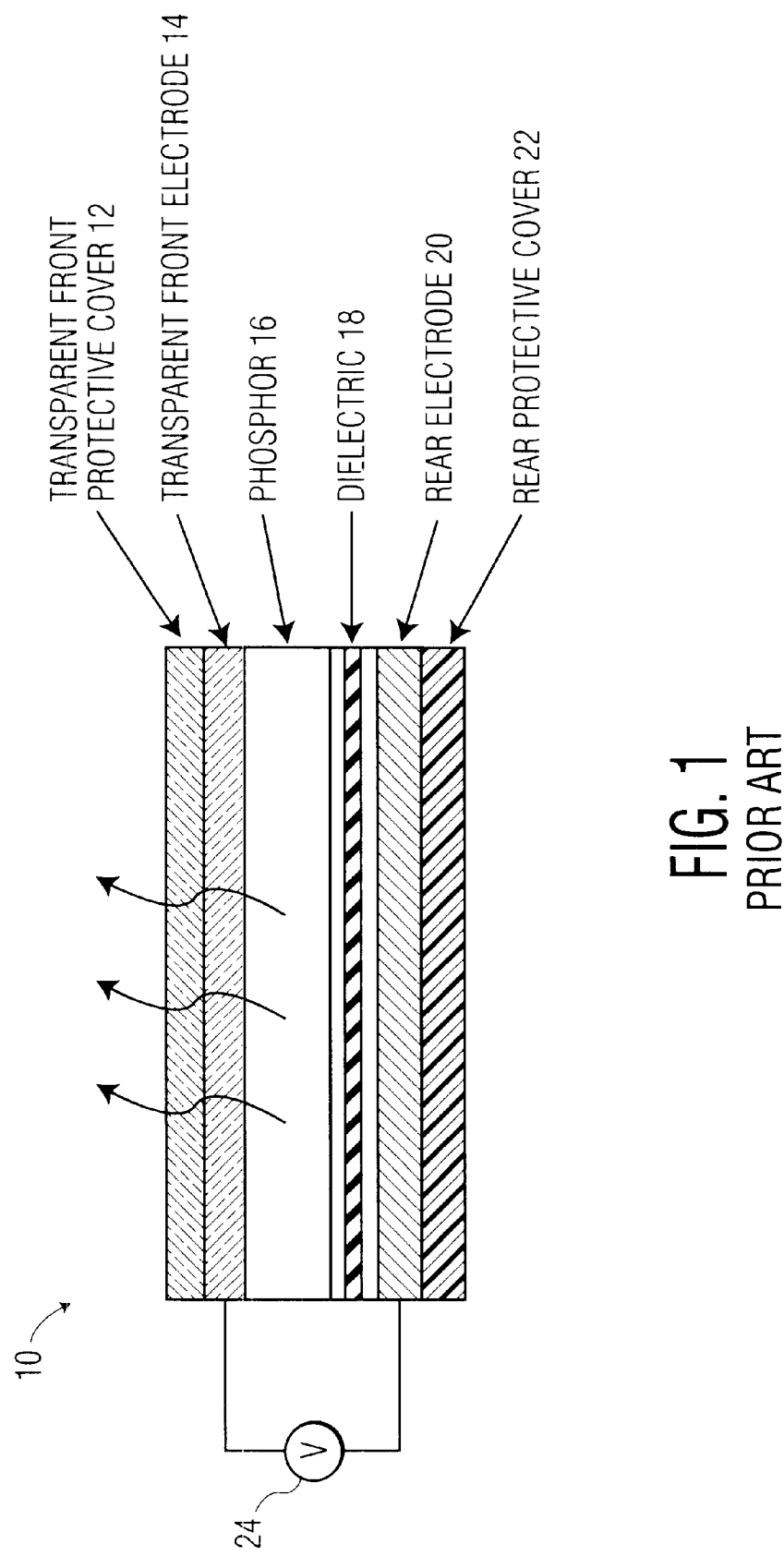
FIG. 1 illustrates a typical electroluminescent panel, in accordance with the prior art.
Figure 3:
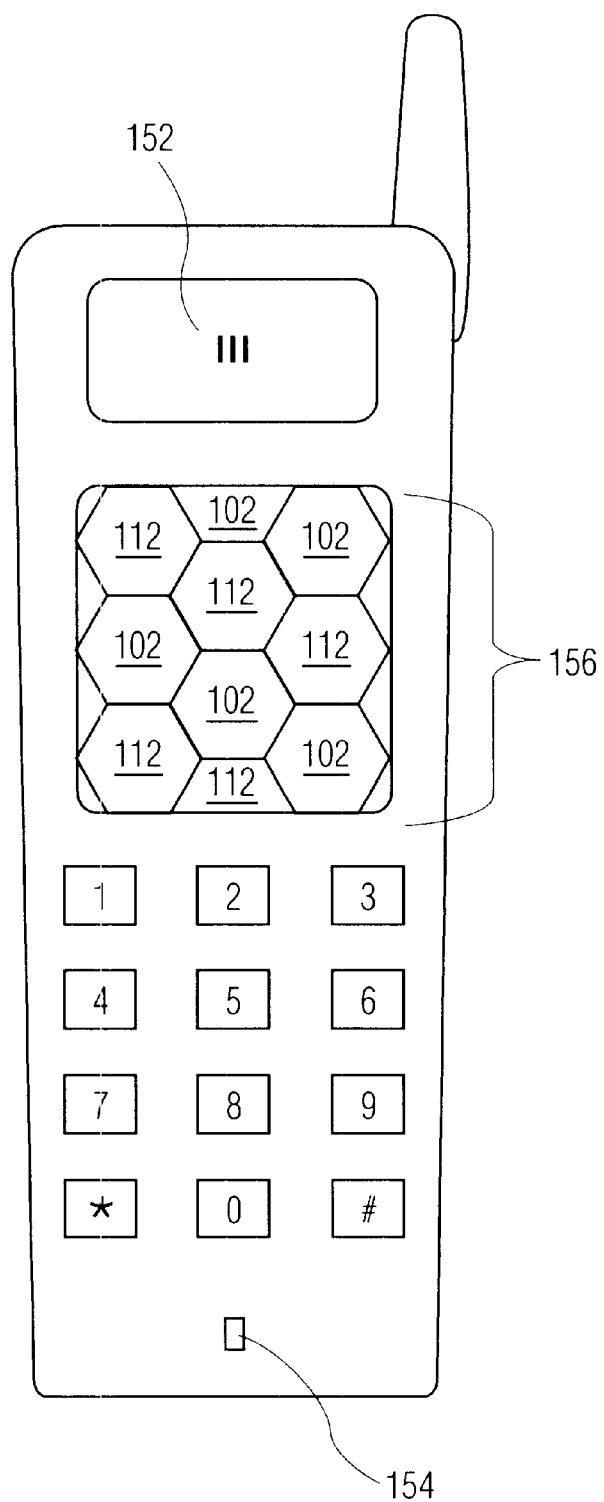
FIG. 3 illustrates basic features of a cellular telephone.

FIG. 3 illustrates basic features of a cellular telephone;

Electroluminescent panel region 102 has a rear electrode 104 and a front electrode 106. Although not shown, electroluminescent panel region 102 also comprises additional layers as illustrated in FIG. 1, such as front and rear protective covers, a phosphor layer and a dielectric element, although for purposes of simplicity, they are not shown herein. Likewise, electroluminescent panel region 112 has a rear electrode 114 and a front electrode 116, and, although not shown, front and rear protective covers, a phosphor layer and a dielectric element. When the electrodes of an electroluminescent panel region are alternately charged and discharged, photons are alternately excited and unexcited, causing visible light 107 and 117 to be emitted from electroluminescent panel regions 102 and 112, respectively.

In the embodiment shown, electroluminescent lamp driver also comprises six current flow control devices such as transistors, designated herein as transistors 131 through 136. In a preferred embodiment, and as shown in the figure, transistors 131 through 133 are P-channel Metal Oxide Semiconductor Field-Effect Transistors (referred to hereinafter as "MOSFETs"), while transistors 134 through 136 are N-channel MOSFETs. Each MOSFET has three terminals: a gate terminal, a source terminal and a drain terminal.

Source terminal 131b of transistor 131 is coupled to positive voltage terminal 122 By of voltage supply source 120. Drain terminal 131c of transistor 131 is coupled to node terminal 137. Node terminal 137 is coupled to rear electrode 104 of electroluminescent panel region 102, and to transistor 134, as will be explained below.

Source terminal 132b of transistor 132 is also coupled to positive voltage terminal 122 of voltage supply source 120. Drain terminal 132c of transistor 132 is coupled to node terminal 138. Node terminal 138 is coupled to front electrode 106 of electroluminescent panel region 102, to front electrode 116 of electroluminescent panel region 112, and to transistor 135, as will be explained below.

Source terminal 133b of transistor 133 is also coupled to positive voltage terminal 122 of voltage supply source 120. Drain terminal 133c of transistor 133 is coupled to node terminal 139. Node terminal 139 is coupled to rear electrode 114 of electroluminescent panel region 112, and to transistor 136, as will be explained below.

Source terminal 134b of transistor 134 is coupled to negative voltage terminal 124 of voltage supply source 120. Drain terminal 134c of transistor 134 is coupled to node terminal 137. As previously mentioned, node terminal 137 is also coupled to rear electrode 104 of electroluminescent panel region 102, and to drain terminal 131c of transistor 131.

Source terminal 135b of transistor 135 is also coupled to negative voltage terminal 124 of voltage supply source 120. Drain terminal 135c of transistor 135 is coupled to node terminal 138. As previously mentioned, node terminal 138 is coupled to front electrode 106 of electroluminescent panel region 102, to front electrode 116 of electroluminescent panel region 112, and to drain terminal 132c of transistor 132.

Source terminal 136b of transistor 136 is also coupled to negative voltage terminal 124 of voltage supply source 120. Drain terminal 136c of transistor 136 is coupled to node terminal 139. As previously mentioned, node terminal 139 is coupled to rear electrode 114 of electroluminescent panel region 112, and to drain terminal 133c of transistor 133.

The gate terminals of each of transistors 131 through 136, designated as gate terminals 131a through 136a, are connected to system controller 110. System controller 110 controls which of transistors 131 through 136 are turned on and off, and also synchronizes the turning on and off of the transistors. As will be explained in greater detail in the flowchart of FIG. 4 below, transistors 131 through 136 are turned on and off by system controller 110 in a particular order and at specified times so as to insure that when electroluminescent panel region 102 is charging (i.e.—when the space between rear electrode 104 and front electrode 106 is compressing), electroluminescent panel region 112 is discharging (i.e.—the space between rear electrode 114 and front electrode 116 is decompressing), and vice versa. It is noted that the configuration shown in FIG. 2 is merely one possible configuration of lamp driver 100, which is not limited in scope in this respect.

While FIG. 2 shows two electroluminescent panel regions, the present invention contemplates that any number of electroluminescent panel regions may be employed, and that the regions may meet each other along straight lines, an interlaced pattern, a checkerboard pattern, or any other conceivable pattern. Regardless of the pattern which is created by the electroluminescent panel regions, the lighting system of the present invention is configured, according to one embodiment, such that a compression which is experienced in one region is offset by a decompression in another region, thereby substantially canceling noise which is created by the displacement of air in the panel.

As previously mentioned, the electroluminescent panel regions of the present invention are particularly well-suited for employment in a cellular telephone. FIG. 3 illustrates the basic features of a cellular telephone 150. Cell phone 150 has a speaker 152 and a microphone 154. Cell phone 150 also has a display panel 156, which comprises contiguous groups of electroluminescent panel regions 102 and 112, each group comprising panel regions having a hexagonal shape. Of course, FIG. 3 illustrates one possible configuration of a cell phone having a display panel comprised of groups of electroluminescent panel regions. In fact, the present invention contemplates that any number of groups in any configuration may be employed.

Figure 4:
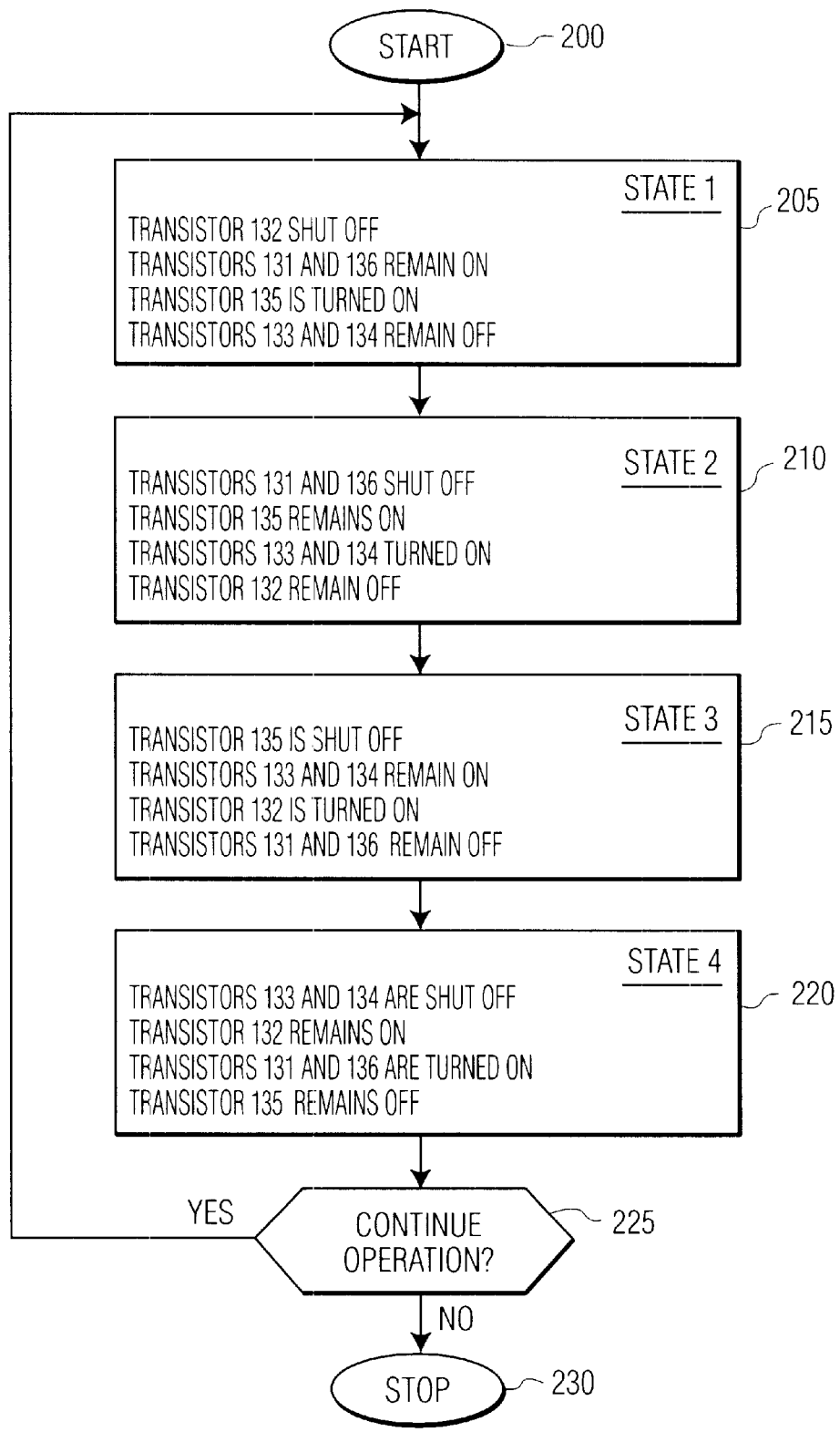
FIG. 4 is a flowchart that illustrates the steps performed in order to alternately charge and discharge electroluminescent panel regions, according to one embodiment of the invention.

As previously mentioned, FIG. 4 is a flowchart that illustrates the steps performed, according to one embodiment of the invention, in order to alternately charge and discharge the respective electroluminescent panel regions. The flowchart starts at step 200 and proceeds to step 205.

At step 205, system controller 110 operates to place electroluminescent lamp driver 100 into a first state. In order to place electroluminescent lamp driver 100 in this first state, system controller 110 turns transistor 132 off and turns transistor 135 on. Transistors 131 and 136 remain on while transistors 133 and 134 remain off. As a result, rear electrode 104 of electroluminescent panel region 102 is charged to voltage level, V. Simultaneously, front electrode 116 of electroluminescent panel region 112 is discharged to zero. As previously mentioned, the rate at which rear electrode 104 is charged is preferably equal to the rate at which front electrode 116 is discharged, such that electroluminescent panel region 102 is compressed at the same rate that electroluminescent panel region 112 is decompressed. The flowchart then proceeds to step 210.

At step 210, system controller 110 operates to place electroluminescent lamp driver 100 into a second state. In order to place electroluminescent lamp driver 100 in this second state, system controller 110 turns transistors 131 and 136 off and turns transistors 133 and 134 on. Transistor 135 remains on while transistor 132 remains off. As a result, rear electrode 114 of electroluminescent panel region 112 is charged to voltage level, V. Simultaneously, rear electrode 104 of electroluminescent panel region 102 is discharged to zero. As previously mentioned, the rate at which rear electrode 114 is charged is preferably equal to the rate at which front electrode 104 is discharged, such that electroluminescent panel region 112 is compressed at the same rate that electroluminescent panel region 102 is decompressed. The flowchart then proceeds to step 215.

At step 215, system controller 110 operates to place electroluminescent lamp driver 100 into a third state. In order to place electroluminescent lamp driver 100 in this third state, system controller turns transistor 135 off and turns transistor 132 on. Transistors 133 and 134 remain on while transistors 131 and 136 remain off. As a result, front electrode 106 of electroluminescent panel region 102 is charged to voltage level V. Simultaneously, rear electrode 114 of electroluminescent panel region 112 is discharged to zero. Preferably, the rate at which front electrode 106 is charged is equal to the rate at which rear electrode 114 is discharged, such that electroluminescent panel region 102 is compressed at the same rate that electroluminescent panel region 112 is decompressed. The flowchart then proceeds to step 220.

At step 220, system controller 110 operates to place electroluminescent lamp driver 100 into a fourth state. In order to place electroluminescent lamp driver 100 in this fourth state, system controller 110 turns transistors 133 and 134 off and turns transistors 131 and 136 on. Transistor 132 remains on while transistor 135 remains off. As a result, front electrode 116 of electroluminescent panel region 112 is charged to voltage level V. Simultaneously, front electrode 106 of electroluminescent panel region 102 is discharged to zero. Again, the rate at which front electrode 116 is charged is preferably equal to the rate at which front electrode 106 is discharged, such that electroluminescent panel region 112 is compressed at the same rate that electroluminescent panel region 102 is decompressed. The flowchart then proceeds to step 225.

At step 225, system controller 110 determines whether the electroluminescent lamp driver 100 is still required to be in operation. If it is, then the flowchart returns to step 205 in order to repeat steps 205 through 220, whereby system controller 100 continues to alternately charge and discharge the respective electrodes of the two electroluminescent panel regions. In each step of each cycle, the rate at which the electrodes of a first electroluminescent panel region is charged (and thus the rate at which the first region is compressed) is preferably equal to the rate at which the electrodes of a second electroluminescent panel region is discharged (and thus the rate at which the second region is decompressed), so as to substantially eliminate the noise generated by the displacement of air between the electrodes. If it is determined at step 225 that the electroluminescent lamp driver is not required to remain in operation, then system controller performs step 230 and stops.

Figure 5:
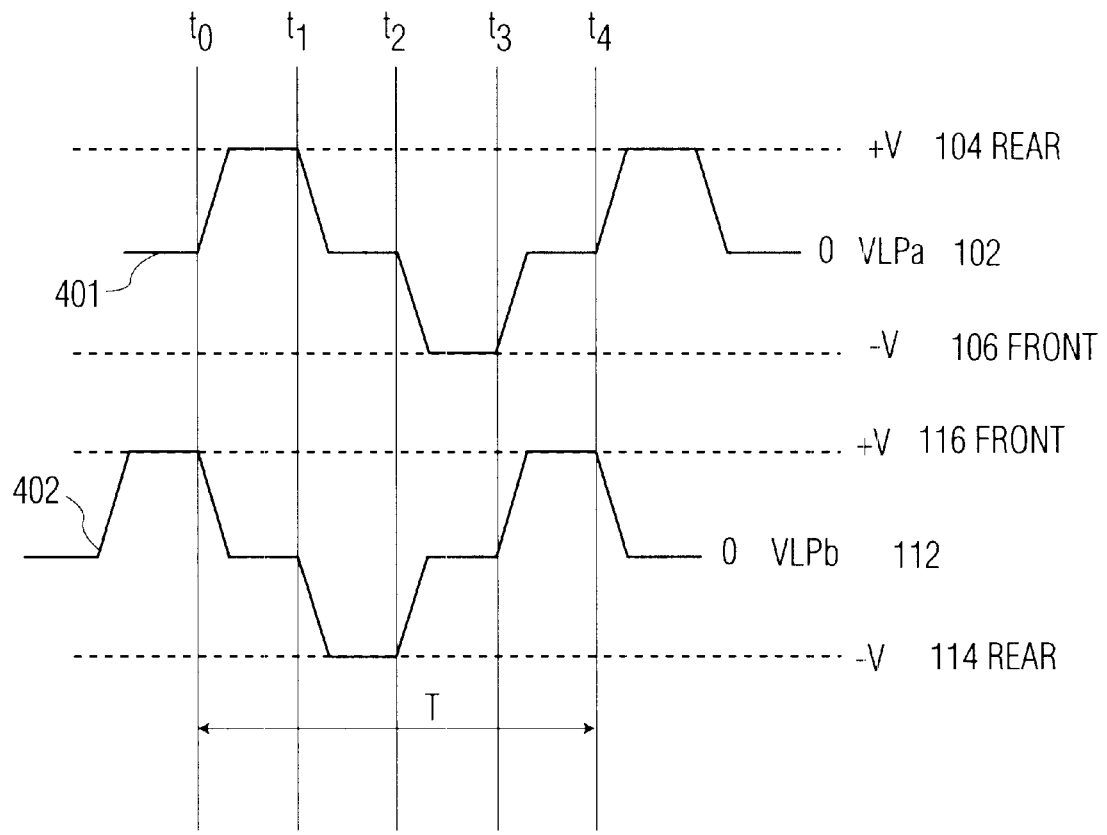
FIG. 5 is a diagram which illustrates the voltage levels of electrodes in electroluminescent panel regions, according to one embodiment of the present invention.

FIG. 5 is a diagram which illustrates the voltage levels of the electrodes in each of the electroluminescent panel regions, according to one embodiment of the present invention. Graphline 401 illustrates the voltage levels in electroluminescent panel region 102, while graphline 402 illustrates the voltage levels in electroluminescent panel region 112. A voltage level of +V at electroluminescent panel region 102 corresponds to rear electrode 104 being charged, while a voltage level of −V at electroluminescent panel region 102 corresponds to front electrode 106 being charged. Furthermore, a voltage level of +V at electroluminescent panel region 112 corresponds to front electrode 116 being charged, while a voltage level of −V at electroluminescent panel region 112 corresponds to rear electrode 114 being charged.

In the embodiment shown, time is measured to the right, wherein time period T corresponds to the amount of time required for electroluminescent lamp driver 100 to completely cycle through the four states identified by steps 205 through 220 of the flowchart in FIG. 4. Thus, as shown in FIG. 5, time period T is divided into four equal time periods, each time period corresponding to one of the four states.

For instance, at time $t_0$, electroluminescent panel region 102 has a voltage of zero, while electroluminescent panel region 112 has a voltage +V. In the time period between $t_0$ and $t_1$, electroluminescent panel region 102 is charged to a voltage +V, while electroluminescent panel region 112 discharges to a voltage of zero. Therefore, this time period corresponds to the first state of the transistors identified in the flowchart of FIG. 4, wherein system controller 110 causes rear electrode 104 of electroluminescent panel region 102 to be charged, while causing front electrode 116 of electroluminescent panel region 112 to be simultaneously discharged. As shown in FIG. 5 and as previously mentioned, the rate at which rear electrode 104 is charged is equal to the rate at which front electrode 116 is discharged, such that electroluminescent panel region 102 is compressed at the same rate that electroluminescent panel region 112 is decompressed.

In the time period between $t_1$ and $t_2$, electroluminescent panel region 102 is discharged to a voltage of zero, while electroluminescent panel region 112 charges to a voltage of −V. This time period corresponds to the second state of the transistors identified in the flowchart of FIG. 4, wherein system controller 110 causes rear electrode 114 of electroluminescent panel region 112 to be charged, while causing rear electrode 104 of electroluminescent panel region 102 to be simultaneously discharged. As shown in FIG. 5 and as previously mentioned, the rate at which rear electrode 114 is charged is equal to the rate at which rear electrode 104 is discharged, such that electroluminescent panel region 112 is compressed at the same rate that electroluminescent panel region 102 is decompressed.

In the time period between $t_2$ and $t_3$, electroluminescent panel region 102 is charged to a voltage −V, while electroluminescent panel region 112 discharges to a voltage of zero This time period corresponds to the third state of the transistors identified in the flowchart of FIG. 4, wherein system controller 110 causes front electrode 106 of electroluminescent panel region 102 to be charged, while causing rear electrode 114 of electroluminescent panel region 112 to be simultaneously discharged. Again, the rate at which front electrode 106 is charged is equal to the rate at which rear electrode 114 is discharged, such that electroluminescent panel region 102 is compressed at the same rate that electroluminescent panel region 112 is decompressed.

Finally, in the time period between $t_3$ and $t_4$, electroluminescent panel region 102 is discharged to a voltage of zero, while electroluminescent panel region 112 charges to a voltage +V. This time period corresponds to the fourth state of the transistors identified in the flowchart of FIG. 4, wherein system controller 110 causes front electrode 116 of electroluminescent panel region 112 to be charged, while causing front electrode 106 of electroluminescent panel region 102 to be simultaneously discharged. Again, the rate at which front electrode 116 is charged is equal to the rate at which front electrode 106 is discharged, such that electroluminescent panel region 112 is compressed at the same rate that electroluminescent panel region 102 is decompressed.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

I claim:

1. A lighting system, comprising:
    at least two electroluminescent panel regions, each of said electroluminescent panel regions including a pair of electrodes with a phosphorous layer therebetween; and
    a lamp driver including a voltage supply source for supply an AC voltage to said electrodes of each of said electroluminescent panel regions so as to cause said phosphorous layer of each of said electroluminescent panel regions to emit visible light,
    wherein said lamp driver is configured to alternatively charge said electrodes of a first of said electroluminescent panel regions while simultaneously discharging said electrodes of a second of said electroluminescent panel regions.

2. The system according to claim 1, wherein a rate of charging said electrodes of said first electroluminescent panel regions is substantially equal to a rate of discharging said electrodes of said second electroluminescent panel regions.

3. The system according to claim 1, wherein said electrodes of said electroluminescent panel regions are compressed when said electrodes are charged and are decompressed when said electrodes are discharged.

4. The system according to claim 3, wherein said electrodes of a first electroluminescent panel region are compressed at a rate which is substantially equal to a rate at which said electrodes of a second electroluminescent panel region are decompressed.

5. The system according to claim 3, wherein the simultaneous compression and decompression of first and second electroluminescent panel regions, respectively, substantially eliminates noise.

6. The system according to claim 5, wherein said lamp driver further comprises a plurality of current flow control devices coupled to said electrodes, so as to selectively charge and discharge said electrodes of said electroluminescent panel regions.

7. The system according to claim 6, wherein said current flow control devices are MOSFET transistors.

8. The system according to claim 6, wherein said lamp driver further comprises a system controller coupled to and configured to control said current flow control devices.

9. The system according to claim 1, wherein said electroluminescent panel regions are employed in a cellular telephone.

10. A lighting system comprising:
    a plurality of electroluminescent panel regions configured to emit visible light when an AC voltage is applied thereto, said electroluminescent panel regions configured to selectively charge and discharge so as to substantially eliminate noise generated by said electroluminescent panel regions.

11. The system according to claim 10, wherein said lighting system further comprises a lamp driver, wherein said lamp driver is configured to alternately charge a first group of said plurality of electroluminescent panel regions while simultaneously discharging a second group of said plurality of electroluminescent panel regions.

12. The system according to claim 11, wherein a rate of charging said first group of electroluminescent panel regions is substantially equal to a rate of discharging said second group of electroluminescent panel regions.

13. The system according to claim 11, wherein said electroluminescent panel regions are compressed when charged and are decompressed when discharged.

14. The system according to claim 13, wherein said first group of electroluminescent panel region are compressed at a rate which is substantially equal to a rate at which said second group of electroluminescent panel region are decompressed.

15. The system according to claim 10, wherein said system further comprises a plurality of current flow control devices so as to selectively charge and discharge said electroluminescent panel regions.

16. The system according to claim 15, wherein said current flow control devices are MOSFET transistors.

17. The system according to claim 6, wherein said system further comprises a system controller coupled to and configured to control said current flow control devices.

18. The system according to claim 10, wherein said electroluminescent panel regions are employed in a cellular telephone.

19. A method of providing light, said method comprising the steps of:
    disposing between a pair of electrodes a phosphorous layer so as to form at least two electroluminescent panel regions;
    supply an AC voltage to said electrodes of each of said electroluminescent panel regions so as to cause said phosphorous layer of each of said electroluminescent panel regions to emit visible light; and
    alternately charging said electrodes of a first of said electroluminescent panel regions while simultaneously discharging said electrodes of a second of said electroluminescent panel regions.

20. The method according to claim 19, wherein a rate of charging said electrodes of said first electroluminescent panel regions is substantially equal to a rate of discharging said electrodes of said second electroluminescent panel regions.

21. The method according to claim 19, wherein said electrodes of said electroluminescent panel regions are compressed when said electrodes are charged and are decompressed when said electrodes are discharged.

22. The method according to claim 19, wherein said method further comprises the step of coupling to said electrodes a plurality of current flow control devices.

23. The method according to claim 22, wherein said coupling step comprises coupling to said electrodes a plurality of MOSFET transistors.

24. The method according to claim 22, wherein said method further comprises the step of coupling to said lamp driver a system controller, wherein said system controller is configured to control said current flow control devices.

25. The method according to claim 19, wherein said method further comprises the step of employing said electroluminescent panel regions in a cellular telephone.

* * * * *